US005770920A

United States Patent [19]

Eckersley et al.

[11] Patent Number: 5,770,920

[45] Date of Patent: Jun. 23, 1998

[54] ELECTROLUMINESCENT LAMP HAVING A TERPOLYMER BINDER

[75] Inventors: Rodney Troy Eckersley, Tempe; James H. Butt, Mesa; Will M. Hooke, Jr., Phoenix; Wayne Alan Wilson, Gilbert, all of Ariz.

[73] Assignee: Durel Corporation, Chandler, Ariz.

[21] Appl. No.: 465,979

[22] Filed: Jun. 6, 1995

[51] Int. Cl.[6] .............................. H01J 1/62; C09K 11/02

[52] U.S. Cl. .......................... 313/506; 313/509; 313/511; 252/301.36

[58] Field of Search .................................... 313/506, 509, 313/511, 502; 315/169.3; 428/917, 690; 252/301.36

[56] References Cited

U.S. PATENT DOCUMENTS

| | | |
|---|---|---|
| 4,417,174 | 11/1983 | Kamijo et al. . |
| 4,455,324 | 6/1984 | Kamijo et al. . |
| 4,816,717 | 3/1989 | Harper et al. . |
| 4,876,481 | 10/1989 | Taniguchi et al. . |
| 5,069,815 | 12/1991 | Aoki et al. . |
| 5,076,963 | 12/1991 | Kameyama et al. . |
| 5,087,679 | 2/1992 | Inukai et al. . |
| 5,156,885 | 10/1992 | Budd ........................................ 427/70 |

OTHER PUBLICATIONS

"Screen–Printable Materials Set for Flexible El Circuitry", *Research Disclosure,* Apr. 1995, p. 248, Anonymous.

*Primary Examiner*—Sandra L. O'Shea
*Assistant Examiner*—Joseph Williams
*Attorney, Agent, or Firm*—Fish & Richardson P.C.

[57] ABSTRACT

An electroluminescent lamp has a luminescent layer placed between a rear electrode layer and a top electrode layer, which is at least partially transparent to light. The electrodes are arranged to excite the luminescent layer by applying a potential to the layer. An insulating layer is placed between the rear electrode layer and the luminescent layer, to increase the capacitance of the lamp. At least one of the layers includes a terpolymer, e.g., vinylidene fluoride-tetrafluoroethylene-hexafluoropropylene. In some applications (e.g., in wristwatches), the luminescent layer includes phosphor, the insulating layer includes barium titanate, and the rear electrode includes silver, all distributed through the terpolymer. In other applications (e.g., in cellular phones or pagers), the rear electrode includes carbon.

20 Claims, 3 Drawing Sheets

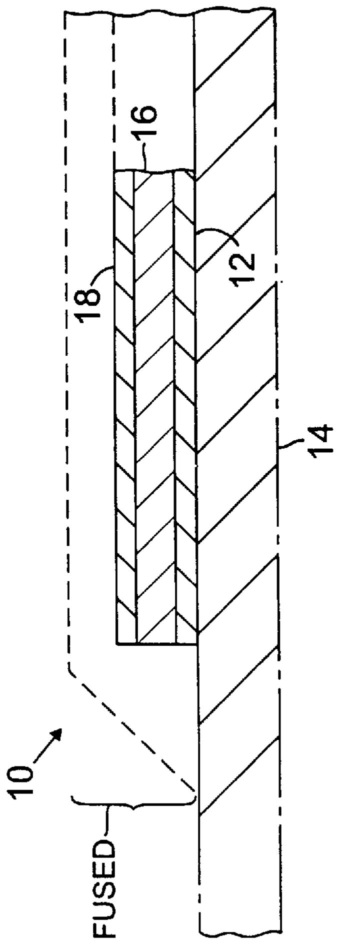
FIG. 2
FIG. 3
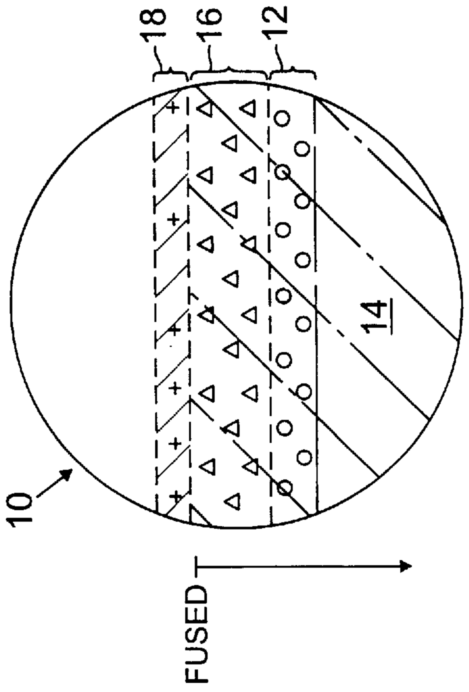

ELECTROLUMINESCENT LAMP HAVING A TERPOLYMER BINDER

BACKGROUND OF THE INVENTION

This invention relates to electroluminescent lamps.

Electroluminescent lamps typically contain a phosphor layer and an insulating layer placed between two electrodes, one of which is transparent. When an AC potential difference is applied across the electrodes, phosphor particles in the luminescent layer become excited and emit light through the transparent electrode.

The phosphor particles are suspended in a binder, e.g., a polymer, such a polyvinylidene fluoride (PVDF) or polyvinylidene fluoride-tetrafluoroethylene. The electrodes are formed by suspending conducting particles in the binder, while the insulating layer includes a dielectric filler dispersed in the binder. The respective layers can be formed by screen printing inks containing the binder and the respective additives.

SUMMARY OF THE INVENTION

In general, in one aspect, the invention features a lamp in which the binder in at least one of the layers includes a terpolymer, for example, vinylidene fluoride-tetrafluoroethylene-hexafluoropropylene.

Preferred embodiments of this aspect of the invention include one or more of the following features.

The layer includes a film of terpolymer produced by deposit of the terpolymer dissolved in a solvent, followed by heating. The solvent is preferably a solvent blend which includes dimethyl acetamide, and may also include a component to increase the boiling point of the solvent, and a component to improve the flow of the solution. For example, the solvent may include at least about 80% by weight dimethyl acetamide, and, for increasing the boiling point, at most about 20% by weight ethylene glycol monobutyl ether acetate. The resulting solution has between 25% and 50% by weight terpolymer (preferably 45%), and, for improving the flow, ethyl acrylate-2-ethylhexyl acrylate at about 2% of the terpolymer weight.

The luminescent layer includes phosphor particles distributed through the terpolymer in about a ratio of between 0.5:1 to 4.5:1 by weight (preferably 1.3:1). The insulating layer includes barium titanate distributed through the terpolymer in about a ratio of between 0.2:1 to 5:1 by weight (preferably 1.8:1).

In some embodiments, the rear electrode includes silver particles distributed through the terpolymer in a ratio of at least about 2:1 by weight (preferably 3:1). Alternatively, the rear electrode includes carbon, and a barrier layer interposed between the rear electrode layer and the insulating layer. The barrier layer is chosen to prevent diffusion between the rear electrode layer and the insulating layer, and remains relatively solid when heated in the layer printing process. The barrier layer is preferably provided by a copolymer, e.g., polyvinylidene fluoride-tetrafluoroethylene.

Because the terpolymer fully dissolves in the solvent (instead of forming a suspension), the resulting solution can be evenly applied to a substrate in a single pass to form a layer of uniform thickness. This allows very thin layers to be formed, decreasing the overall thickness of the lamp.

In addition, because the solvent can hold up to 50% terpolymer by weight, a high resin to particle ratio is achievable in each layer. Using smaller amounts of particles (e.g., phosphor, barium titanate, silver or carbon) and producing the layers in a single pass significantly reduce the cost of production of the lamp. The lamp can also be manufactured in less time, because the terpolymer dissolves more quickly in the solvent than other common binders.

Although less phosphor is used, the lamp is more luminous than other lamps operated at the same voltage. This is because the lamp layers are thinner, and the terpolymer is more transparent to light than other commonly used materials.

In addition, because the solution is evenly applied in one pass, it is not necessary to heat the layers to fuse them. Heating the layers does, nonetheless, improve the uniformity of the layers. Because the terpolymer has a relatively low melting point (90 degrees Celsius), heating is performed at lower temperatures (by at least 25 degrees Celsius) than those necessary for other binders. The lower temperature heating causes the lamp layers to shrink less during heating, which results in lamps produced with closer tolerances and better manufacturing yields.

Because the layers have a uniform thickness, the resulting breakdown voltage of the lamp varies little from lamp to lamp. In addition, the terpolymer has a higher dielectric constant than other binders (e.g., copolymers), increasing the capacitance of each layer for a given thickness. The terpolymer thus allows thinner layers to be constructed at a given capacitance.

Use of terpolymer as the binder also prevents delamination (i.e., separation of the layers of the lamp), because the terpolymer binds well to top electrodes, particularly those composed of indium tin oxide (ITO). The terpolymer also forms an impervious barrier, preventing humidity from causing the phosphor to deteriorate, or causing the silver particles to migrate between the electrodes.

The lamp is useful in any application where small sized, thin lamps resistant to temperatures of up to 65 degrees Celsius are needed. In particular, the lamp is used in wristwatches, pagers, and cellular telephones.

Other features and advantages of the invention will be apparent from the following description and from the claims.

BRIEF DESCRIPTION OF THE DRAWING

FIG. 2 is a diagrammatic side view of a portion of the lamp shown in FIG. 1.

FIG. 3 is a diagrammatic, enlarged side section view of a portion of the lamp shown in FIG. 1.

DESCRIPTION OF THE PREFERRED EMBODIMENTS

Figure 1:
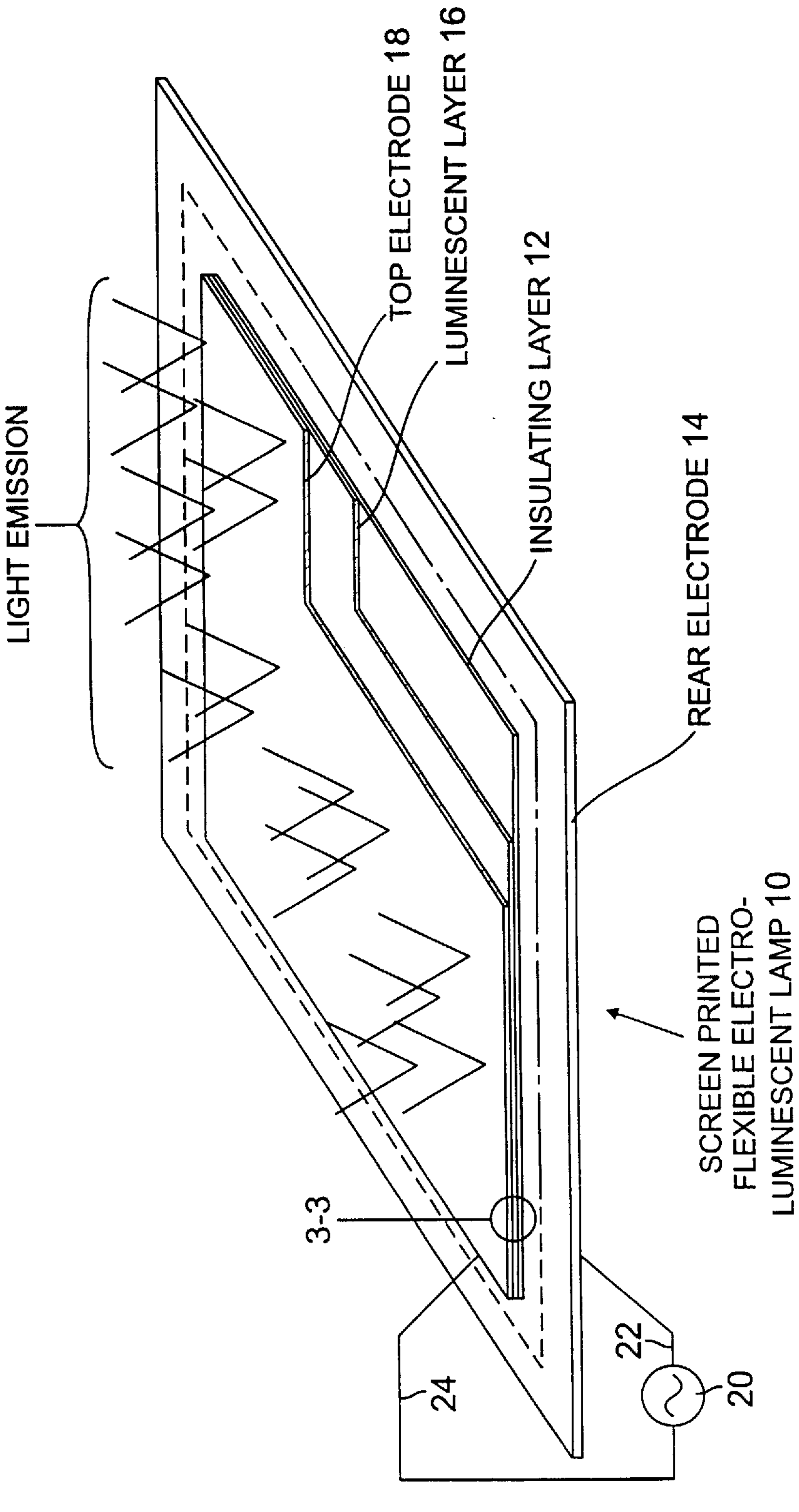
FIG. 1 is a diagrammatic, perspective view of an electroluminescent lamp, according to the invention.

Referring to FIGS. 1 through 3, electroluminescent lamp 10 contains a dielectric insulating layer 12 placed on a rear electrode 14. A luminescent layer 16 is disposed between the insulating layer and a top electrode 18 that is at least partially transparent to light. A source of electric AC potential 20 is applied across the electrodes by means of connectors 22, 24. The connectors may be, for instance, pad connectors, eyeletted copper ribbon leads, or crimped through connectors. The luminescent layer and the insulating layer are both 0.001 inch thick, the rear electrode is 0.0004 inch thick, and the top electrode is polyester between 0.005 and 0.007 inches thick carrying a conductive coating of about 2,000 Angstroms. (The figures are not drawn to scale).

In use, source 20 applies an AC potential difference across the rear and top electrodes to excite the luminescent layer. This causes the luminescent layer to emit light through the top electrode.

The top electrode is typically an indium tin oxide coating on a polyester film, produced by sputter coating, and available from numerous thin film coating producers. The remaining layers in the lamp are formed by screenprinting an appropriate ink on the top electrode.

The inks are formed by dissolving the terpolymer in a solvent containing dimethyl acetamide (available from J. T. Baker in Phillipsburg, N.J.) or any other suitable material. The solvent may be composed entirely of dimethyl acetamide, or may be decreased up to 80% by weight. The remaining portion of the solvent can be supplied by ethylene glycol monobutyl ether acetate (available as Ektasolve EB Acetate solvent from Eastman Chemical Products, in Kingsport, Tenn.). The Ektasolve increases the boiling point of the solution, and thus allows the solvent to remain on the screenprinter longer before evaporating. A substantially uncrosslinked terpolymer of vinylidene fluoride-tetrafluoroethylene-hexafluoropropylene (available as Kynar 9301 or Kynar ADS from Atochem, located in Philadelphia, Pa.) is dissolved in the solvent at between 25% to 50% by weight, preferably 45%. Modaflow is added at 2% by weight of the terpolymer weight. Modaflow is an ethyl acrylate and 2-ethylhexyl acrylate copolymer (available from Monsanto, in St. Louis, Mo.) that improves the flow of the solution. The resulting solution is placed in a jar and mixed by rollers overnight.

The ink used to print the luminescent layer is formed by adding phosphor powder to the solution at between about 0.5 to 4.5 parts per weight to 1 part of terpolymer by weight, but preferably a 1.3:1 weight ratio of phosphor to terpolymer is used. This range provides a minimum dry weight of the luminescent layer of 3 g per square foot. The phosphor powder contains particles between 25 and 35 microns in size, and is available as copper activated zinc sulfide (phosphor types 723, 737, 738, 823, 824) from OSRAM Sylvania in Towanda, Pa. Either uncoated or coated phosphor can be used, but coated phosphor (such as that described in U.S. Pat. No. 5,156,885) is preferred.

The ink used to form the insulating layer is formed by dispersing barium titanate powder in the terpolymer solution, at between about 0.2 to 5 parts by weight to 1 part terpolymer by weight. This range provides a minimum insulating layer dry weight of 2.5 g per square foot. Preferably, a 1.8:1 weight ratio of barium titanate to terpolymer is employed. The barium titanate is available as product 52592 from TAM Ceramics, in Niagara Falls, N.Y.

The ink used to form the rear electrode is made by adding silver flake powder at a minimum of about 2 parts by weight to 1 part terpolymer by weight. Preferably, a weight ratio of about 3:1 of silver to terpolymer is employed. Silver is best used in lamps that will only be lit for short periods, e.g., wristwatches.

The lamp is manufactured by first screenprinting the ink for the luminescent layer on the ITO electrode, using a 150 mesh polyester screen. The resulting phosphor layer is heated at 125 degrees Celsius for ten minutes. The resulting luminescent layer has a dry weight of about 4.5 g per square foot.

Next, the dielectric ink is screen printed on top of the phosphor layer using a 196 mesh polyester screen. The layers are then heated at 125 degrees Celsius for 10 minutes. The resulting insulating layer has a dry weight of about 4.0 g per square foot.

Last, the rear electrode ink is screen printed on top of the insulating layer using a 305 mesh polyester screen. The layers are again heated at 125 degrees Celsius for 10 minutes. The resulting rear electrode layer has a dry weight of about 2.5 g of silver per square foot.

Because the same terpolymer is used in all three layers, the layers easily fuse together during heating to form a single, flexible unit (as shown in FIG. 3). In addition, temperature changes are not likely to cause delamination, because each layer has approximately the same thermal expansion characteristics.

Other embodiments are within the following claims.

For example, in applications where the lamp is lit for relatively long periods, e.g., cellular phones or pagers, carbon is preferred for the rear electrode. Carbon is less likely to migrate from the rear electrode to the top electrode in conditions of high humidity. Migration of the silver particles does not generally pose a problem in the lamp of FIG. 1, if the lamp is turned on only for short periods of time, as in the case of providing lighting for wrist watches.

Figure 4:
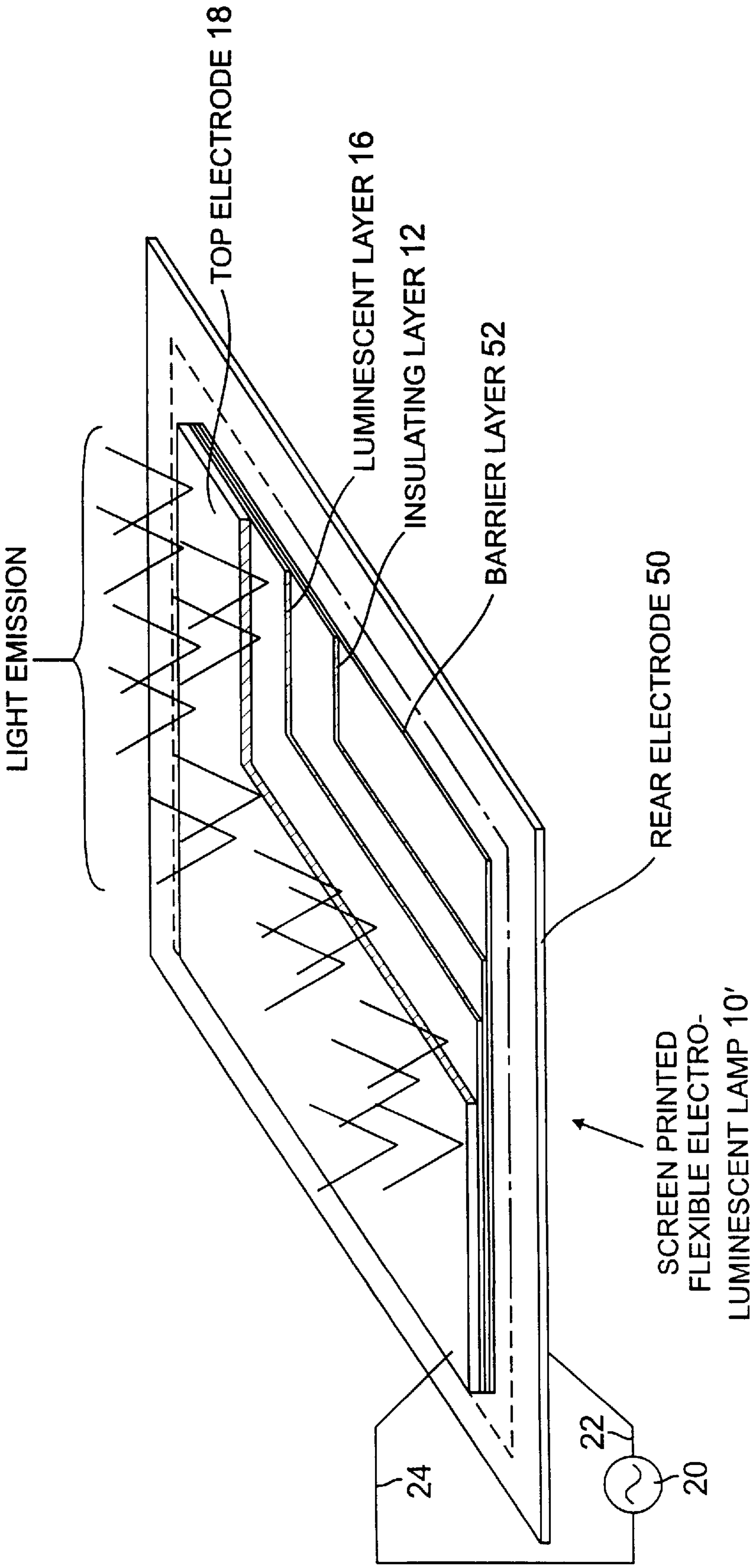
FIG. 4 is a diagrammatic, perspective view of another embodiment of an electroluminescent lamp.

Referring to FIG. 4, lamp 10' has a rear electrode 50 containing carbon, and an insulating layer 12, luminescent layer 16 and top electrode 18 that are identical to those in FIG. 1. Other conductive materials may also be employed in the rear electrode layer, such as graphite, and nickel. A barrier layer 52 is interposed between the rear electrode and the insulating layer to prevent diffusion between the insulating layer and the rear electrode layer. The barrier layer contains a copolymer, such as polyvinylidene fluoride-tetrafluoroethylene (PVDF-TFE, available as Kynar 7201 or Kynar SL from Atochem, in Philadelphia, Pa.). The layers are screen printed on the top electrode in the manner described above.

In addition, top electrode 18 can be replaced by a mixture of ITO and terpolymer screen printed on polyester.

It will be understood by those skilled in these formulations that other components may be included in each of the compositions for various effects. Among these are rheology modifiers (e.g., wetting agents, antifoam agents and leveling agents) for improving the screen printability of the compositions, and adhesion promoters to increase the adhesion between the respective printed layers. Other compounds (e.g., hardeners) can be added to the terpolymer to improve performance, if necessary.

Some lamps may require rear insulators which can be screen printed or taped onto the back of the rear electrode. This prevents the rear electrode from shorting to an external material. The insulator may be formed from the terpolymer or PVDF-TFE copolymer described above, or may be made from an ultraviolet curable ink.

While screen printing has been described in detail, the layers may be formed using other known techniques such as roll coating, roll to roll printing, knife coating, etc. Other high dielectric particles may be employed in the insulating layer, such as lead zirconate, lead titanate, titania, etc.

What is claimed is:

1. An electroluminescent lamp comprising a luminescent layer, a rear electrode layer and a top electrode layer on opposite sides of the luminescent layer, the electrode layers being arranged to apply a potential to said luminescent layer, said top electrode layer being at least partially transparent to light emitted by said luminescent layer when said potential is applied, and an insulating layer placed between said rear electrode layer and said luminescent layer, wherein said luminescent layer, said rear electrode layer, and said insulating layer each comprises a terpolymer.

2. The lamp of claim 1 wherein said terpolymer comprises vinylidene fluoride-tetrafluoroethylene-hexafluoropropylene.

3. The lamp of claim 2 wherein said terpolymer layers comprise a film of terpolymer produced by deposit of said terpolymer dissolved in a solvent, followed by heating.

4. The lamp of claim 3 wherein said solvent comprises dimethyl acetamide, a component to increase the boiling point of the solvent, and a component to improve the flow of the solution.

5. The lamp of claim 4 wherein said solvent comprises at least about 80% by weight dimethyl acetamide, at most about 20% by weight ethylene glycol monobutyl ether acetate, and ethyl acrylate-2-ethylhexyl acrylate at about 2% by weight of the terpolymer weight, the resulting solution of the terpolymer and solvent containing 45% terpolymer by weight.

6. The lamp of claim 3 wherein said luminescent layer further comprises phosphor particles distributed through said terpolymer.

7. The lamp of claim 6 where said phosphor particles and terpolymer are distributed in a range of about 0.5 to 4.5 parts phosphor to 1 part terpolymer by weight.

8. The lamp of claim 7 wherein said phosphor particles and terpolymer are distributed in about a ratio of 1.3:1 by weight.

9. The lamp of claim 3 wherein said insulating layer further comprises barium titanate distributed through said terpolymer.

10. The lamp of claim 9 wherein said barium titanate is distributed in a range of about 0.2 to 5 parts for every one part of terpolymer by weight.

11. The lamp of claim 10 wherein said barium titanate and said terpolymer are distributed in about a ratio of 1.8:1 by weight.

12. The lamp of claim 3 wherein said rear electrode layer comprises said terpolymer and silver particles distributed through said terpolymer.

13. The lamp of claim 12 wherein said silver is distributed in at least 2 parts for every one part of terpolymer by weight.

14. The lamp of claim 13 wherein said silver particles and said terpolymer are distributed in a ratio of about 3:1 by weight.

15. The lamp of claim 2 wherein said rear electrode layer includes carbon particles dispersed in said terpolymer.

16. The lamp of claim 15 further comprising a barrier layer interposed between said rear electrode layer and said insulating layer.

17. The lamp of claim 16 wherein said barrier layer is selected to limit diffusion between said rear electrode layer and said insulating layer.

18. The lamp of claim 16 wherein said barrier layer is selected to remain relatively solid when heated during formation of the layers.

19. The lamp of claim 16 wherein said barrier layer comprises a copolymer.

20. The lamp of claim 19 wherein said copolymer comprises polyvinylidene fluoride-tetrafluoroethylene.

* * * * *